United States Patent [19]

Rippberger

[11] Patent Number: 4,979,886

[45] Date of Patent: Dec. 25, 1990

[54] REMEDIATION OF COMBUSTIBLE ORGANIC CONTAMINATED WATER

[75] Inventor: Mark L. Rippberger, Lompoc, Calif.

[73] Assignee: Newlandex Corporation, Oxnard, Calif.

[21] Appl. No.: 302,751

[22] Filed: Jan. 27, 1989

[51] Int. Cl.$^5$ .............................................. B01J 12/00
[52] U.S. Cl. ...................................... 422/129; 55/53; 55/196; 423/1 A
[58] Field of Search ................ 422/129; 210/170, 747; 55/53, 196, 200, 201; 123/1 A; 166/266, 267, 369, 372

[56] References Cited

U.S. PATENT DOCUMENTS

| | | |
|---|---|---|
| 1,401,101 | 12/1921 | Ehrhart . |
| 2,062,771 | 12/1936 | Stead ...................................... 55/196 |
| 2,698,055 | 12/1954 | Williams . |
| 2,937,140 | 7/1956 | Stinson . |
| 3,204,861 | 9/1965 | Brown . |
| 3,280,009 | 10/1966 | Ackermann et al. . |
| 3,548,938 | 12/1970 | Parker ................................. 166/266 |
| 3,898,058 | 8/1975 | McGill . |
| 4,243,526 | 1/1981 | Ransmark . |
| 4,319,964 | 3/1982 | Katz et al. . |
| 4,323,122 | 4/1982 | Knopik . |
| 4,401,569 | 8/1983 | Jhaveri et al. . |
| 4,536,293 | 8/1985 | Babineaux . |
| 4,608,163 | 8/1986 | Yohe . |
| 4,659,347 | 4/1987 | Schrems . |
| 4,660,639 | 4/1987 | Visser et al. . |
| 4,663,037 | 9/1987 | Breslin . |
| 4,698,136 | 10/1987 | El-Allawy . |
| 4,699,719 | 10/1987 | Finley ................................. 55/169 |
| 4,713,089 | 12/1987 | Robbins . |
| 4,730,672 | 3/1988 | Payne . |

FOREIGN PATENT DOCUMENTS 189772 11/1922 United Kingdom .................... 99/53

OTHER PUBLICATIONS

Perry et al., Chemical Engineer's Handbook, 4th Edition, 1950, McGraw-Hill, pp. 18-53.
The Ins and Outs of Airstripping Chemicals from Water, Applied Technologies Group.
Evaporation of Benzene, Toluene, and O-Xylene from Contaminated Ground Water, Paul D. Kuhlmeier.
Vapor Extraction Treatment System, Converse Environmental Consultants California.
Cleanup of Contaminations, Terra Vac.
Soil Ventilation for the Removal of Adsorbed Liquid Hydrocarbons in the Subsurface, Batchelder et al., Proceedings, Nov. 1986.
Air Stripping, R. E. Wright Associates, Inc.
Packed Towers, Bulletin PT 74, Croll-Reynolds.

*Primary Examiner*—Robert J. Warden
*Assistant Examiner*—D. John Griffith, Jr.
*Attorney, Agent, or Firm*—Marvin E. Jacobs

[57] ABSTRACT

A system for remediating water contaminated with combustible hydrocarbons, particularly groundwater contaminated with gasoline, operates by separation of hydrocarbons from the water by spray aeration of a heated water stream under vacuum. The air-hydrocarbon vapor mixture produced by spray aeration is combusted in an internal combustion engine which generates heat to heat the inlet water and power to drive the vacuum pump and the water lift pump. The exhaust from the engine can be catalytically reacted before exhaust to the atmosphere. The components of the system can be mounted on a portable support and moved to a site and operated continuously to remediate contaminated soil and water.

14 Claims, 2 Drawing Sheets

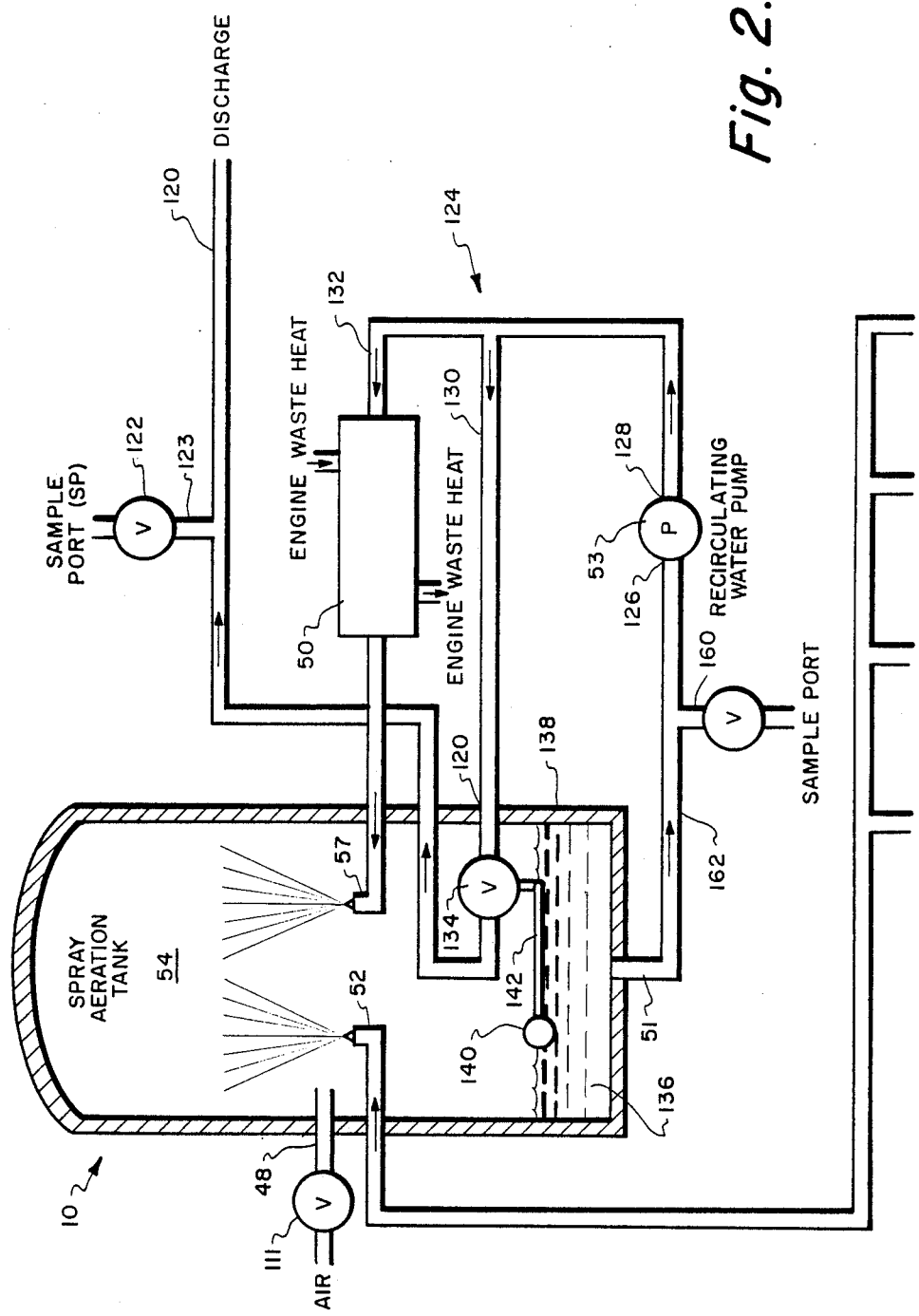

REMEDIATION OF COMBUSTIBLE ORGANIC CONTAMINATED WATER

TECHNICAL FIELD

This invention relates to remediation of contaminated water and, more particularly, this invention relates to treatment of ground water contaminated with combustible organic compounds such as gasoline by thermal spray aeration under vacuum followed by combustion of the separated organic compounds. The invention also relates to utilizing the mechanical energy produced by the engine to operate the remediation system.

BACKGROUND OF THE INVENTION

Public officials are just becoming aware of the nature and extent of the problem of contamination of the water supply from storage tanks leaking various chemicals into the soil. The latest EPA estimates in the United States place the volume of liquid hazardous waste stored at 20 billion gallons annually. These materials are stored at about 4,000 locations. It is also estimated that there are over ¾ of a million individual motor fuel tanks and over 300,000 gas stations and trucking companies with gasoline storage tanks. As many as ⅓ of the petroleum tanks may be leaking. Over half are estimated to leak at a rate in an excess of 6 gallons per day. This roughly translates into 1.3 million gallons of fuel that is lost into the subsurface.

Soil excavation has been the traditional method for decontaminating a site with absorbed hydrocarbon contamination. It is often difficult to assess the full extent of the contamination. Besides being costly, excavating the soil merely changes the location of the contaminated soil. Hazardous sites are becoming fewer and fewer on expense and the regulation concerned with transporting the hazardous waste from the sites to the storage site makes this unattractive method of disposal. Current laws make the owner of the waste responsible forever for the stored waste whether it is the contaminated dirt or the spent carbon absorbent.

Soil ventilation is a cost effective way to decontaminate soil. This is effective in locations where the contamination has not reached groundwater. Currently there are two general methods used for remediation of groundwater before it can be discharged into a reinfiltration gallery, sewer or storm drain. These are carbon filtration or air stripping. Carbon filtration is not desirable on highly contaminated sites as the cost of carbon and its associated handling and disposal costs become prohibitive. With air stripping, the cost of carbon is eliminated leaving only replacement costs of packing as the major maintenance expense. However, in areas where emissions are controlled, carbon canisters for air polishing are required. When the soil is highly contaminated with hydrocarbon, the associated cost of carbon again becomes prohibitive.

One proposal for the elimination of gasoline vapors is to burn the recovered vapors. The level of hydrocarbons recovered in the vapor stream is usually not sufficient to maintain combustion by these vapors alone. Either additional fuel must be added to the vapor to sustain combustion or catalyst must be used to maintain combustion.

STATEMENT OF THE INVENTION

The remediation system of the invention is capable of on-site, cost effective remediation of soil contaminated with hydrocarbon vapor, free liquid hydrocarbon product and with water containing hydrocarbons. The vapor output from the system is delivered to an internal combustion engine and combusted to produce power capable of operating the vacuum, air compressor and water pumps and any other energy required by the system. The heat in the exhaust can be utilized for re-heating the contaminated water before it enters the spray tower.

The system can be mounted on a skid, trailer or truck bed so that it is fully portable and self-contained. The system can be transported and left on-site to operate until all contaminants are removed from the soil and the site is satisfactorily remediated.

Separation of the combustible hydrocarbons from the water is accomplished by spray aeration under vacuum at elevated temperature. The use of vacuum and elevated temperature both increase the rate at which the hydrocarbon such as gasoline evaporates. The vapors are captured in a flowing air stream and the enhanced concentration of vapors is such that it is compatible with the carburation and combustion in the internal combustion engine. The vapors in the air stream are well below flamability level thus they cannot be burned. However, by feeding the vapors to an internal combustion engine the vapors are consumed as part of the combustion in the engine while producing useful work and heat for the process. The emissions from the engine can be treated in a conventional catalytic converter so that the eventual effluent to the environment is harmless.

The spray aeration system reduces the high airflow rates that are encountered in a spray aerator containing packing trays. The smallest commercial packed tower air strippers operate at 300 CFM which is 2 to 15 times the gas input rate of small internal combustion engines. In an air stripper, increased area is provided by dividing the water into a large volume of droplets having a very large surface area. Air is moved quickly over the surface of the hydrocarbon laden water droplets in order to volatilize and strip the hydrocarbons. By elevating the temperature of the water and lowering the pressure in the air stripper tank the rate of evaporating of hydrocarbons is significantly increased. The hydrocarbons at low pressure and elevated temperature flash from the water into the air. The vacuum level must be maintained below a certain limit in order to avoid evaporating a large quantity of water into the air. Too much water in the air would unduly effect the fuel to air ratio and cause the engine to stall. As a further feature of the invention the water can be recirculated to the spray nozzles in order to insure removal of sufficient hydrocarbon from the water.

The air-hydrocarbon vapor mixture is delivered to the air fuel intake to the engine where it can be mixed with auxiliary fuel, if necessary, and then combusted in the combustion engine. Combustion consumes the hydrocarbon mixture and converts it to water vapor and carbon oxides. The engine's air:fuel ratio is adjusted to maintain sufficient combustion. Because the entire system is maintained under vacuum until the air-hydrocarbon vapors enter the cylinders of the engine for combustion any leak of seals or connections provide entry of air into the system rather than leakage of hydrocarbon out. Furthermore, if the engine stops, all systems stop since the engine is the source of vacuum and pump power. The well pumps can be pneumatically powered from an air compressor driven by the engine. Therefore, well pumping ceases if the engine shuts off.

The engine can also drive a vacuum pump and a water-lift pump. The vacuum pump is utilized to impress a vacuum on the spray tower. The lift pump initially causes the recovery of free product followed by recovery of the hydrocarbon laden contaminated water from the recovery wells. The free product can be recovered and stored or it can be burned on-site if desired. The vaporized free product mixed with air can be initially burned in the engine. After water recovery starts, vacuum is drawn on the spray tower and the heated water is sprayed upwardly through a spray nozzle or a set of spray nozzles into the tower and is stripped with an air stream to form the hydrocarbon containing air mixture which is pulled by vacuum and delivered to the internal combustion engine.

These and many other features and attendant advantages of the invention and will become apparent as the invention becomes better understood by reference of the following detailed description when considering in conjunction with the accompanying drawings.

BRIEF DESCRIPTION OF THE DRAWINGS

FIG. 2 is a schematic drawing showing the water flow and valving portion of the remediation system.

DETAILED DESCRIPTION OF THE INVENTION

Figure 1:
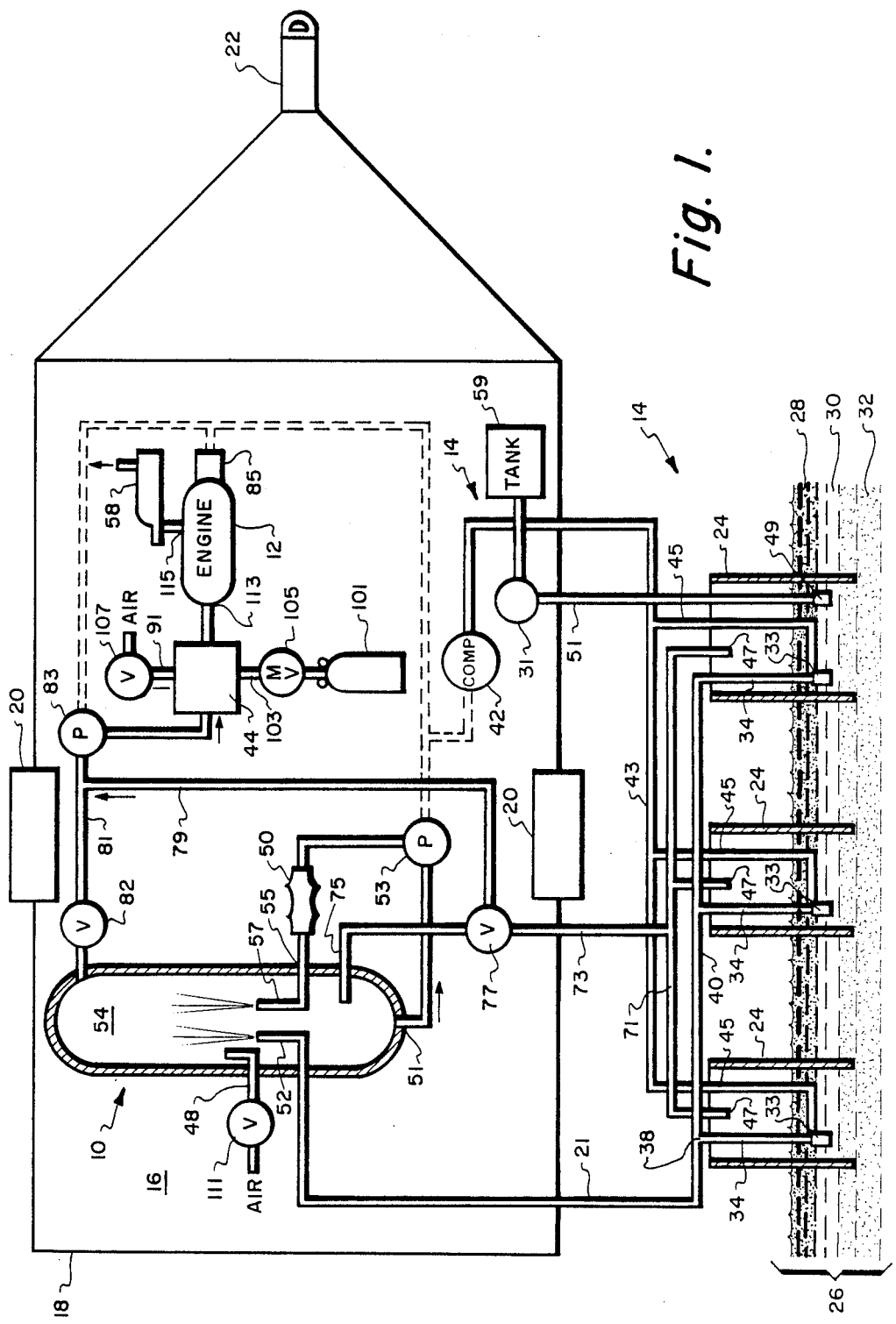
FIG. 1 is a schematic drawing of a diagram of a remediation system in accordance with the invention.

Referring now to FIG. 1, the main components of the remediation system comprise a spray tower 10, a combustion engine 12 and a contaminated water recovery well subsystem 14. All the components 10, 12, 14 of the system can be mounted on a common support such as the floor 16 of a trailer 18 having wheels 20 and a tow yoke 22. All components of the system are interconnected in a manner to maximize efficiency and minimize space requirements. Both the thermal and power output of the engine are conserved and utilized in the system of the invention. Once the system is in steady operation, it can be operated virtually unattended continuously 24 hours a day until the site is completely remediated. The system of the invention has been designed such that the air-hydrocarbon vapor output of the spray tower is a mixture combustible in the cylinders of the engine 12. Should the system go out of balance, the engine will automatically stop which safely shuts down the system, even if unattended.

The well recovery system is connected to a plurality of wells 24 drilled into the contaminated zone 26. The zone can comprise a vadose layer 28 contaminated with hydrocarbon vapor and liquid, a layer 30 of free liquid and the pool 32 of contaminated water. A recovery pipe 34 extends through each well 24. The lower perforated inlet end 33 of each pipe 34 extends into the contaminated zone 26 and the overlying layer 30 of free hydrocarbon liquid product. The upper end 38 of each pipe 34 is connected to a first manifold 40. The liquid is removed from the zone by means of a lift pump 33 in each well driven by an air compressor 42. Each downhole lift pump 33 is connected to an inlet 45 in each well by a second manifold 43.

Any free hydrocarbon vapors and the free hydrocarbon liquid are usually first removed in the remediation process. Otherwise, as water is removed, it will be replaced from ground water sources and in turn will become contaminated increasing the volume of contaminated water.

The hydrocarbon vapors are removed by drawing vacuum on the well. This also results in some vaporization of the liquid hydrocarbon layer 30. A third manifold 71 is connected to an inlet 47 to each well. The hydrocarbon vapors in the manifold 71 are delivered to a line 73 and can be fed to a nozzle 75 within the spray tank 10 or can be by-passed by means of a valve 77 to a by-pass line 79.

The by-pass line 79 is connected to the exhaust conduit 81 from the spray tank 10 which connects to the vacuum pump 83. The vacuum pump 83 can be a separate pump or the vacuum can be generated by connecting the exhaust line 81 directly to the manifold of the engine 12. The recovered hydrocarbon vapors are mixed with air in the spray tower 10. The air is introduced into the tower 10 through air inlet 48 containing a metering valve 111 to form a combustible mixture. The mixture is drawn under control of valve 82 by vacuum pump 83 into the engine 12. The by-passed hydrocarbon vapors in line 79 are also drawn by vacuum pump 83 into the engine 12. A carburetor 44 can be provided to add air through inlet 91 to the hydrocarbon vapors or to add auxiliary fuel such as propane to the hydrocarbon mixture from tank 101 through line 103 containing a metering valve 105. The flow rate and air:fuel mixture can be controlled by vacuum control valve 82, air inlet metering valves 107, 111 and auxiliary fuel metering valve 105.

The liquid hydrocarbon layer could be removed by operating air compressor 42 to drive a pneumatic pump 33. The liquid hydrocarbon layer 30 can also be removed by placing a skimmer 49 in the layer 30 of free liquid and pumping the liquid out of the wells 24 by means of pump 31 through line 51 into a tank 59. After the hydrocarbon vapors and the free product have been withdrawn from the zone, the contaminated water is lifted in the pipes 34 by means of downhole, pneumatic pumps 33 and flows through recovery line 21 into the first water spray nozzle 52. A portion of the water is preferably recirculated through circuit containing outlet 51, pump 53, heat exchanger 50 and inlet 55 to a second spray nozzle 57.

A more detailed view of the water recycle circuit 124 is illustrated in FIG. 2. The recirculation is repeated a sufficient number of times so that the water discharged through outlet 51 contains no more hydrocarbon contamination than permitted by local regulations for discharge or reinjection into the wells. The discharge stream can be sampled at a sample port 123 containing a valve 122. The recycle circuit 124 contains a pump 53, the inlet end 126 of which is connected to the outlet 51 on the spray tower 10. A further sample port 160 can be positioned on the outlet line 162. The outlet 128 of the pump 53 is connected to two branch conduits 130, 132.

The first branch 130 is connected to the discharge outlet 120 through a level sensing valve 134 such as a float valve positioned within a pool 136 of water maintained in the bottom portion 138 of the spray tower 10. The float valve contains a float 140 mounted on an activating arm 142 connected to the valve 134. When the level of water in the bottom 138 of the spray tower 10 rises above the float 140, the float 140 rises and the activating arm 142 opens the valve 134 to discharge water until the float 140 returns the valve 134 to its closed position.

The second branch conduit 132 is connected to the spray nozzle 57 containing the water heat exchanger 50. All water not by-passed to discharge by the valve 134, passes into the branch 132 and is heated and sprayed upwardly through nozzle 57. The flow rate of the pump 53 and the position of the float 140 can be utilized to adjust the number of times it is necessary to recirculate the water to achieve a desired water quality.

As the heated water sprays upwardly from nozzles 52 and 57 into the head space 54 maintained under vacuum by the vacuum pump 83, the hydrocarbons vaporize and are stripped into the air stream drawn into the vessel through the air inlet 48. The air-hydrocarbon mixture is drawn by the vacuum pump 83 into the carburetor 44 or directly into the fuel/air inlet 113 of the engine 12.

The air-hydrocarbon mixture is combusted in the engine 12 to produce heat and power. The exhaust gases flow out exhaust outlet 115 through a catalytic converter 58 before being emitted to the atmosphere. The exhaust may flow through the water heat exchanger 50 before being exhausted to the atmosphere. The rotary output from the engine can be directly coupled to the water recirculation pump 53, vacuum pump 83, and air compressor 42 by means of a power take-off 85. The output of the air compressor 42 can be used to drive pneumatically operated air and vacuum pumps. Pneumatic pumps are safer to use than electrical pumps in a combustible hydrocarbon environment.

Initial tests were conducted on the spray aeration system and the engine to determine the basic efficiency of the equipment in remediating gasoline contaminated water and thermally oxidizing the vapors. In this initial test, water with dissolved hydrocarbons of between 610 ppm and 1700 ppm was fed to the spray aeration unit at approximately 3 gallons per minute. Vacuum on the tank was maintained at 12 inches of Mercury, and the recirculating water was heated to 100° F. The vapor flow rate was 40 cfm. The resulting discharged water showed significant reduction in hydrocarbons, the discharge having a resulting average TPH of 32 ppm, a clean up of 90-99%. These results are between 8-18% higher than spray aeration without vacuum or heat.

The engine exhaust was analyzed for hydrocarbons using both a continuous infra-red meter, and by taking samples and analyzing them in a gas chromatograph. These tests showed the emitted hydrocarbons to be, on the average, below 70 ppm in the exhaust stream. At this level, less than 1 lb. per day is emitted from the exhaust while over 125 lbs. of hydrocarbons are consumed by the engine during the same time period. Benzene in the exhaust stream was near 1 part per million. By adjusting the air fuel ratio the benzene level was lowered to less than 0.1 ppm, resulting in emissions of less than 0.003 lb. per day of benzene. This level is low enough to pass the risk assessment in the Los Angeles area.

The system was installed on a site with three (3) contaminated wells; two (2) have free product, the third has no free product. The vacuum was placed on the first well and the air fuel ratio was adjusted.

This first well produced enough vapors to run the engine without any additional fuel, and the flow rate from the well had to be restricted to avoid running in an over-rich state of combustion. The well, which had been bailed of free product before the system was started, had 1 foot of free product in it after 1.5 minutes of operation. Prior to the introduction of a vacuum on this well, a one gallon recovery of free product would take 48 hours or longer. The well was restarted and the same results occurred: free product flow to the well increased. Two positive results were generated from this first site test:

1. Vacuum from the system does increase flow to the well.
2. This small compact system (3 feet wide, 10 feet long, and 11 feet high) is capable of thermally oxidizing up to 120 lbs. of hydrocarbons per day, at a considerable cost savings over carbon canisters.

An equivalent system using 150 lbs. carbon canisters would require up to 10 canisters per day as well as shipping and disposal costs of the spent canisters. Added to that are electricity costs of over 12 kw to power downwell pumps, blowers, and recirculation pumps, as well as a vapor extraction pump. This is in comparison to the 0.75 gallons fuel/hour required to power this system, with no handling or disposal cost for carbon.

The system of the invention was installed at a contaminated site. The system was designed to remove gasoline vapors from the soil and groundwater at this site. This equipment was operated and tested for four (4) months. During this time period a number of tests were conducted. These tests included: influent and effluent water from the system; influent vapor to the system; exhaust emissions from the system; flow rates of vapor and water from the wells; and free product flow rates from the wells.

The test water showed a ninety-five percent (95%) reduction in TPH from the influent to the effluent with the effluent TPH, Xylene and Ethylbenzene meeting drinking water standards. Benzene and Toluene were slightly higher than drinking water standards. While adjustments were being made to further reduce these levels, no further testing has been conducted as free product was developing in the well which needed to be removed prior to further testing of the water.

Influent vapors from the wells shows about 9 lbs./hr. being removed from the wells and used to power the engine. Emission tests on a two-hour source test showed no significant variation in emissions. 98.8% of all incoming vapors were consumed in the combustion process. With further adjustments 99.6% of the incoming vapors were consumed in the combustion process. The maximum vapor flow rate from the wells on this site were measured at 16 cfm showing the equipment is adequately sized to handle the three (3) wells which it is drawing from.

Flow rate of free product and water in the wells increases with the application of the vacuum. Before the application of the vacuum the flow rate of free product into a well was measured at 1 gallon per day. The water flow rate into the well was measured at 0.2 gallons per minute. A vacuum of 12 inches of water was placed on the well. The flow rates increased under the influence of the vacuum to 1 gallon per hour of free product and 0.75 gallons per minute of water per well.

After four (4) months of operation and testing it was decided to replace the prototype with a production model. This model incorporates numerous improvements, based on the test operation of the prototype including a propane powered engine, engine mounted air compressor and refinements to the vapor and air fuel ratio controls. This machine is currently operating 24 hours per day with no adjustments required, other than the routine maintenance.

Currently approximately 415 gallons of free product have been skimmed from the three (3) wells and another 675 gallons have been consumed in the operation of the engine giving a total approximation of 1,090 gallons of gasoline remediated to date at this site.

The current equipment in one day combust enough vapor to fill ten (10) 150 lb. carbon canisters to the level of break through. This is approximately $5,000 per day in savings over carbon. This savings does not include the further savings of not having to manifest and dispose of the used carbon or the electric costs to power a carbon filtration system. Also, the wells currently are supplying 100% of the operating fuel, resulting in an even further saving. In vapor combustion versus carbon this system has paid for itself in the short period of time it has been in operation.

Vacuum enhanced spray aeration with thermal oxidation has been demonstrated as an effective method of removing hydrocarbons from contaminated groundwater and combusting the contaminants so that they are no longer a significant health hazard.

The vacuum which extends to the well is effective in increasing the flow of free product to the well as it extracts vapors from the well for combustion. This system has been demonstrated to be an economical and practical alternative to carbon canisters and their associated costs.

The vacuum spray aeration tank has been demonstrated to have an equivalent effectiveness of a packed-tower air stripper, without the problems of packing fouling or the expense of packing replacement costs. Savings are realized in both the initial cost of equipment and the operating costs of a conventional system using vacuum extraction, a packed-tower air stripper, and carbon polishing.

While optimization of operating parameters still require further definition, this system has been shown to be both practical and cost effective for remediation of gasoline contaminated groundwater and contaminated soil vapors.

It is to be realized that only preferred embodiments of the invention have been described and that numerous substitutions, modifications and alterations are permissible without departing from the spirit and scope of the invention as defined in the following claims.

I claim:

1. A system for remediation of water contaminated with combustible hydrocarbon comprising in combination:
    a closed vessel housing an open spray chamber;
    a water inlet provided on the vessel, spray means connected to the water inlet and disposed within the chamber for spraying water upwardly in the chamber;
    a first water outlet connected to the vessel;
    heating means connected to the water inlet for heating the water;
    vacuum means connected to the vessel for lowering the pressure within the vessel;
    an air inlet provided on the vessel connected to the chamber for entraining in the air stream combustible hydrocarbons released from the spray water to form a combustible air-hydrocarbon mixture;
    a combustible mixture outlet in the upper wall of the vessel for removing the mixture from the chamber; and
    a combustion engine having an exhaust outlet and having a fuel inlet connected to the combustible mixture outlet of the vessel for combusting the mixture.

2. A system according to claim 1 in which components of the system are mounted on a portable support.

3. A system according to claim 1 further including carburetor means having an inlet connected to the combustible mixture outlet of the vessel for receiving said combustible mixture and said carburetor means having an outlet connected to the fuel inlet to the engine.

4. A system according to claim 3 further including auxiliary fuel tanks and a proportioning valve, said proportioning valve having a first branch connected to the combustible mixture outlet of the vessel and having a second branch which is connected to the auxiliary fuel tanks containing a fuel combustible in said engine.

5. A system according to claim 1 further including a catalytic converter having an inlet connected to the exhaust from said engine and having an outlet.

6. A system according to claim 5 in which said heating means further includes a heat exchanger having a flow channel connected to the outlet of the catalytic converter.

7. A system according to claim 1 in which the water outlet is disposed at the bottom of the vessel and further including means for recirculating water from the outlet at the bottom of the vessel to the spray means.

8. A system according to claim 7 in which the spray means includes a first set of spray nozzles and the recirculation means includes a first pump and a separate second set of spray nozzles, said heating means being present within said recirculating means.

9. A system according to claim 8 in which the recirculation means includes means for maintaining a pool of water at the bottom of the vessel.

10. A system according to claim 9 in which the pool maintaining means includes a water withdrawal valve and water level control means responsive to the level of water in the pool and adapted to actuate said water withdrawal valve.

11. A system according to claim 10 in which the water level control means includes a float connected by a lever to said withdrawal valve.

12. A system according to claim 10 further including a second pump for withdrawing hydrocarbon vapor and contaminated water from a well at a contaminated site.

13. A system according to claim 12 in which the first pump and second pump each include a drive member and further including coupling means for operatively coupling the energy output of the engine to the drive members of the first and second pumps.

14. A system according to claim 13 in which said pumps each contain an air inlet, said engine includes a drive shaft, said pumps are pneumatically operated and said coupling means includes an air compressor connected to the drive shaft of the engine and having an air output connected to the air inlet of each of said pumps.

* * * * *